(12) United States Patent
Lim et al.

(10) Patent No.: US 8,850,888 B2
(45) Date of Patent: Oct. 7, 2014

(54) INERTIAL SENSOR

(75) Inventors: Seung Mo Lim, Gyunggi-do (KR); Sung Wook Kim, Gyunggi-do (KR); Sung Jun Lee, Gyunggi-do (KR); Kyo Yeol Lee, Gyunggi-do (KR); Yun Sung Kang, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 273 days.

(21) Appl. No.: 13/409,039

(22) Filed: Feb. 29, 2012

(65) Prior Publication Data

US 2013/0167634 A1 Jul. 4, 2013

(30) Foreign Application Priority Data

Dec. 29, 2011 (KR) .................... 10-2011-0146074

(51) Int. Cl.
*G01C 19/56* (2012.01)
*G01P 15/09* (2006.01)

(52) U.S. Cl.
USPC .................... 73/504.12; 73/514.34

(58) Field of Classification Search
CPC .. G01C 1/56; G01C 19/5642; G01C 19/5719; G01C 19/5607; G01C 19/5649; G01C 19/56569; G01C 19/565699; G01P 15/18; G01P 15/14; G01P 15/0922; G01P 15/0907; G01P 15/097; G01P 15/09
USPC ............... 73/504.02, 504.04, 504.12, 504.13, 73/504.14, 504.15, 514.34, 514.33
See application file for complete search history.

(56) References Cited

U.S. PATENT DOCUMENTS

| 6,003,371 | A | * | 12/1999 | Okada | 73/504.02 |
| 6,865,943 | B2 | * | 3/2005 | Okada | 73/504.12 |
| 8,418,559 | B2 | * | 4/2013 | Pan et al. | 73/514.34 |
| 8,508,105 | B2 | * | 8/2013 | Kang et al. | 310/329 |
| 2006/0032307 | A1 | * | 2/2006 | Schiller | 73/504.12 |
| 2011/0146404 | A1 | * | 6/2011 | Jeung et al. | 73/514.34 |
| 2012/0297874 | A1 | * | 11/2012 | Kim et al. | 73/504.12 |
| 2013/0125652 | A1 | * | 5/2013 | Kim et al. | 73/514.34 |

FOREIGN PATENT DOCUMENTS

KR 10-2011-0072229 6/2011

* cited by examiner

*Primary Examiner* — Helen Kwok
(74) *Attorney, Agent, or Firm* — Ladas & Parry, LLP

(57) ABSTRACT

Disclosed herein is an inertial sensor. The inertial sensor 100 according to preferred embodiments of the present invention includes: a membrane 110; a mass body 120 disposed under the membrane 110; a piezoelectric body 130 formed on the membrane 110 to drive the mass body 120; and trenches 140 formed by being collapsed in a thickness direction of the piezoelectric body 130 so as to vertically meet a direction in which the mass body 120 is driven. By this configuration, the trenches are formed by being collapsed in a thickness direction of the piezoelectric body 130 to provide directivity while retaining the rigidity of the piezoelectric body 130 to prevent a wave from being propagated in an unnecessary direction, thereby driving the inertial sensor 100 in a desired specific direction.

17 Claims, 7 Drawing Sheets

INERTIAL SENSOR

CROSS REFERENCE TO RELATED APPLICATION

This application claims the benefit of Korean Patent Application No. 10-2011-0146074, filed on Dec. 29, 2011, entitled "Inertial Sensor", which is hereby incorporated by reference in its entirety into this application.

BACKGROUND OF THE INVENTION

1. Technical Field

The present invention relates to an inertial sensor.

2. Description of the Related Art

Recently, an inertial sensor has been used as various applications, for example, military such as an artificial satellite, a missile, an unmanned aircraft, or the like, vehicles such as an air bag, electronic stability control (ESC), a black box for a vehicle, or the like, hand shaking prevention of a camcorder, motion sensing of a mobile phone or a game machine, navigation, or the like.

The inertial sensor generally adopts a configuration in which a mass body is adhered to an elastic substrate such as a membrane, or the like, in order to measure acceleration and angular velocity. Through the configuration, the inertial sensor may calculate the acceleration by measuring inertial force applied to the mass body and may calculate the angular velocity by measuring Coriolis force applied to the mass body.

In detail, a scheme of measuring the acceleration and the angular velocity using the inertial sensor is as follows. First, the acceleration may be calculated by Newton's law of motion "F=ma", where "F" represents inertial force applied to the mass body, "m" represents a mass of the mass body, and "a" is acceleration to be measured. Among others, the acceleration a may be obtained by sensing the inertial force F applied to the mass body and dividing the sensed inertial force F by the mass m of the mass body that is a predetermined value. Further, the angular velocity may be calculated by Coriolis force "F=2 mΩ×v", where "F" represents the Coriolis force applied to the mass body, "m" represents the mass of the mass body, "Ω" represents the angular velocity to be measured, and "v" represents the motion velocity of the mass body. Among others, since the motion velocity V of the mass body and the mass m of the mass body are values known in advance, the angular velocity Ω may be calculated by detecting the Coriolis force F applied to the mass body.

Meanwhile, the inertial sensor according to the prior art includes a piezoelectric body that is formed above a membrane (diagram) so as to drive a mass body, as disclosed in Korean Laid-Open Patent No. 10-2011-0072229. Here, the piezoelectric body drives the membrane in a specific direction (for example, an X-axis direction or a Y-axis direction). In this case, unbalance may occur during the general driving due to a non-uniform thickness of the membrane, mis-alignment of a piezoelectric body or an electrode, or the like. Therefore, it is difficult for the piezoelectric body to drive the membrane only in a desired specific direction. That is, even though the piezoelectric body vibrates the membrane in an X-axis direction, a wave is propagated in an undesired direction causing unbalance during the general driving, such that the membrane is vibrated out of a predetermined angle in an X-axis direction. As described above, when the membrane is not driven in the desired specific direction, sensitivity of the inertial sensor may be finally degraded.

SUMMARY OF THE INVENTION

The present invention has been made in an effort to provide an inertial sensor capable of preventing a wave from being propagated in an undesired direction by forming trenches so as to be collapsed in a thickness direction of a piezoelectric body to provide directivity while retaining rigidity of the piezoelectric body.

According to a preferred embodiment of the present invention, there is provided an inertial sensor, including: a membrane; a mass body disposed under the membrane; a piezoelectric body formed on the membrane to drive the mass body; and trenches formed by being collapsed in a thickness direction of the piezoelectric body so as to vertically meet a direction in which the mass body is driven.

The inertial sensor may further include: a first electrode formed on a top surface of the piezoelectric body; and a second electrode formed on a bottom surface of the piezoelectric body.

The trenches may be formed immediately before the second electrode.

The trenches may be extendedly formed to a predetermined thickness of the membrane.

A first axis and a second axis vertical to each other may be defined on a plane parallel with the membrane, and when the mass body is driven in the first axis direction and the second axis direction, the trenches may be formed to have an arc based on an intersecting point of the first axis and the second axis so that the trenches vertically meet the first axis direction and the second axis direction.

The trenches may be formed to have an arc divided into four so that two trenches facing each other vertically meet the first axis and the two remaining trenches facing each other vertically meet the second axis.

The trenches may be formed to have an arc formed by dividing the concentric circle.

When the trenches are formed to have an arc by dividing at least three concentric circles, a gap among respective concentric circles may be constant.

The piezoelectric body may be partitioned into an inner annular region surrounding a center of the piezoelectric body and an outer annular region surrounding the inner annular region, and the first electrode may include: driving electrodes patterned in an arc divided into N in the inner annular region; and sensing electrodes patterned in an arc divided into N in the outer annular region to correspond to the driving electrodes.

The trenches may be formed to have an arc divided into N between the driving electrodes and sensing electrodes adjacent to each other.

The trenches may be formed to have an arc formed by dividing the concentric circle into N.

When the trenches are formed to have an arc formed by dividing at least three concentric circles, a gap among respective concentric circles may be constant.

The piezoelectric body may be partitioned into an inner annular region surrounding a center of the piezoelectric body and an outer annular region surrounding the inner annular region, and the first electrode may include: sensing electrodes patterned in an arc divided into N in the inner annular region; and driving electrodes patterned in an arc divided into N in the outer annular region to correspond to the driving electrodes.

The trenches may be formed to have an arc divided into N between the driving electrodes and sensing electrodes adjacent to each other.

The trenches may be formed to have an arc formed by dividing the concentric circle into N.

When the trenches are formed to have an arc formed by dividing at least three concentric circles, a gap among respective concentric circles may be constant.

The mass body may be disposed under a central portion of the membrane and may further include posts disposed under edges of the membrane.

DESCRIPTION OF THE PREFERRED EMBODIMENTS

Figure 1:
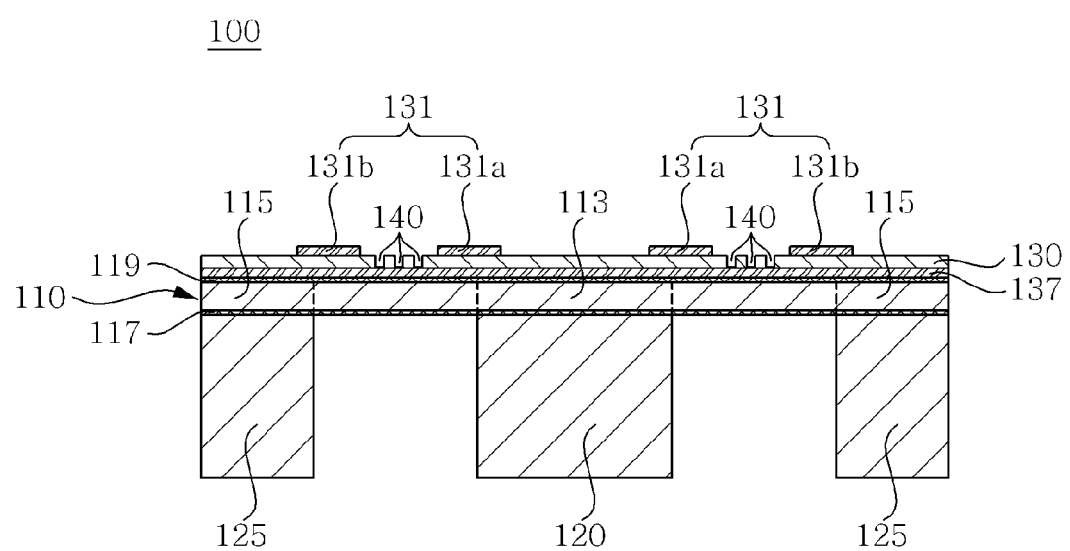
FIG. 1 is a cross-sectional view of an inertial sensor according to a preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In addition, the present invention may be modified in various different ways and is not limited to the embodiments provided in the present description. Further, in describing the present invention, a detailed description of related known functions or configurations will be omitted so as not to obscure the subject of the present invention.

Hereinafter, preferred embodiments of the present invention will be described in detail with reference to the accompanying drawings.

Figure 2:
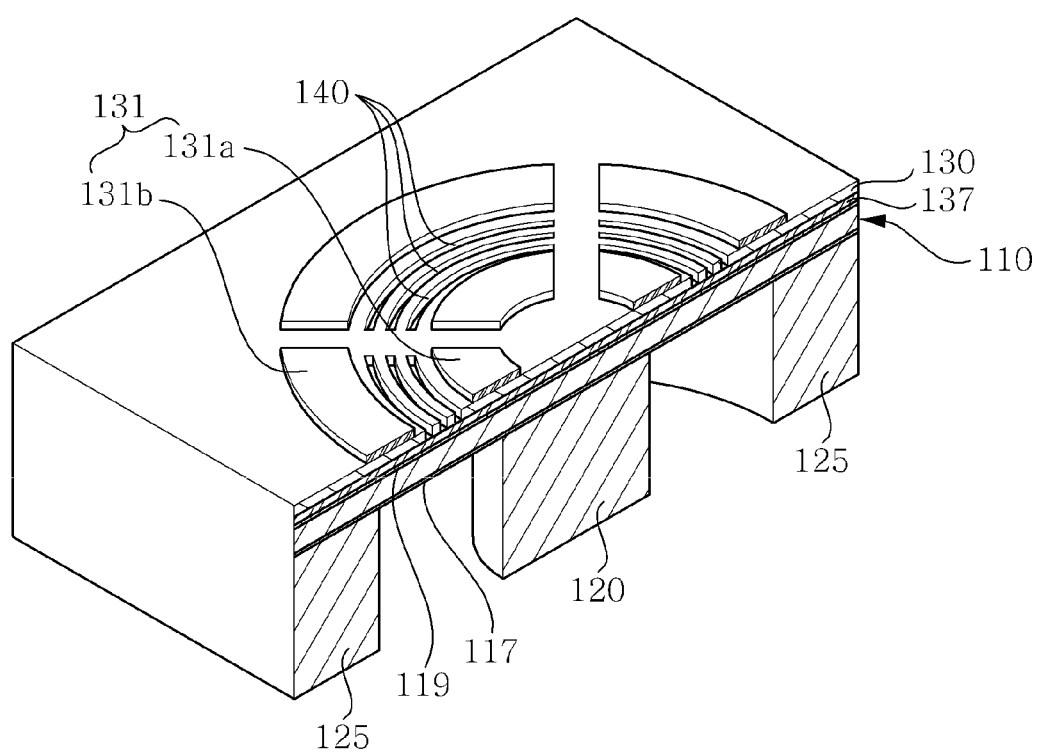
FIG. 2 is a cut-away perspective view of the inertial sensor shown in FIG. 1.
Figure 3:
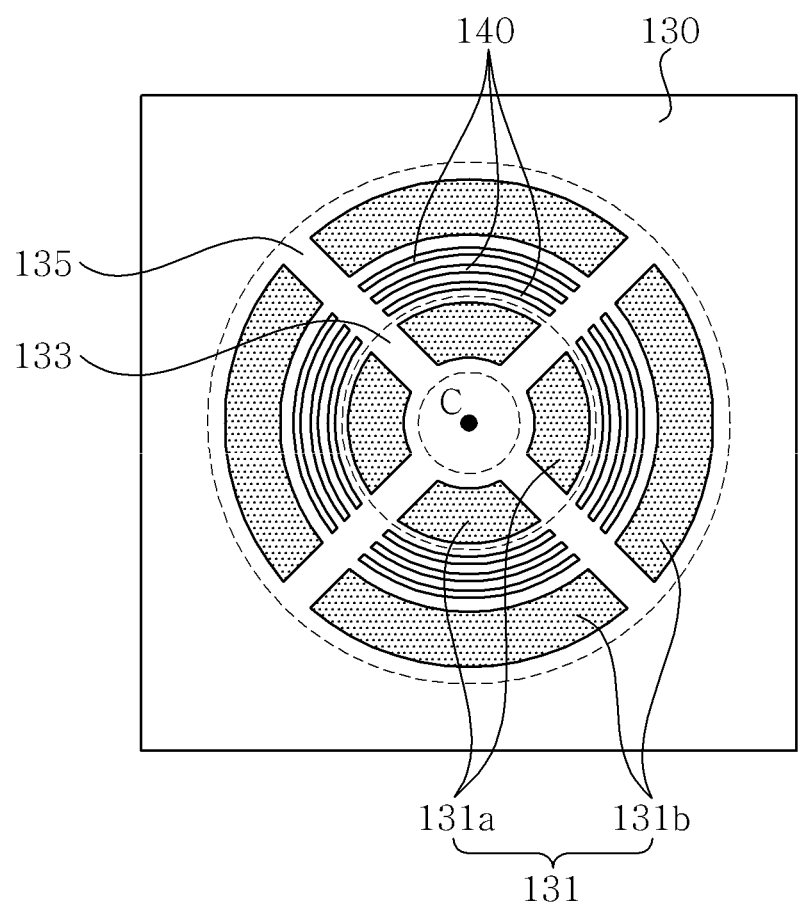
FIG. 3 is a plan view of the inertial sensor shown in FIG. 1.

FIG. 1 is a cross-sectional view of an inertial sensor according to a preferred embodiment of the present invention, FIG. 2 is a cut-away perspective view of the inertial sensor shown in FIG. 1, and FIG. 3 is a plan view of the inertial sensor shown in FIG. 1.

As shown in FIGS. 1 to 3, an inertial sensor 100 according to a preferred embodiment of the present invention is configured to include a membrane 110, a mass body 120 disposed under the membrane 110, a piezoelectric body 130 formed above the membrane 110 to drive the mass body 120, and trenches 140 formed by being collapsed in a thickness direction of the piezoelectric body 130 so as to vertically meet a direction in which the mass body 120 is driven.

The membrane 110 is formed in a plate shape and has elasticity so as to displace the mass body 120. In this configuration, a boundary of the membrane 110 is not accurately identified. As shown in FIG. 1, the membrane 110 may be partitioned into a central portion 113 of the membrane 110 and an edges 115 disposed along an outside of the membrane 110. In this case, the mass body 120 is disposed under the central portion 113 of the membrane 110 and the posts 125 are disposed under the edges 115 of the membrane 110. Therefore, the edges 115 of the membrane 110 are fixed by being supported to the posts 125 and the displacement corresponding to the movement of the mass body 120 is generate at the central portion 113 of the membrane 110 based on the edges 115 of the fixed membrane 110.

The mass body 120 is displaced by an inertial force or a Coriolis force and is disposed under the central portion 113 of the membrane 110. In addition, the posts 125 may be disposed under the edges 115 of the membrane 110 so as to ensure a space in which the mass body 120 may be displaced. That is, the posts 125 are formed in a hollow shape to support the bottom portion of the edges 115 of the membrane 110, such that the posts 170 serves to secure the space in which the mass body 120 may be displaced. In this case, the mass body 120 may be formed in, for example, a cylindrical shape and the posts 125 may be formed in a rectangular pillar shape having a cavity in a cylindrical shape formed at a center thereof (see FIG. 2). That is, when being viewed from a transverse section, the mass body 120 is formed in a circular shape and the posts 125 are formed in a square shape having a circular opening provided at the center thereof. However, the shape of the mass body 120 and the posts 125 is not limited thereto and thus, the mass body 120 and the posts 125 may be formed in all the shapes that are known to those skilled in the art.

Meanwhile, the above-mentioned membrane 110, mass body 120, and the posts 125 may be formed by selectively etching a silicon on insulator (SOI) substrate. A silicon oxide film ($SiO_2$) 117 of the SOI substrate may remain between the mass body 120 and the membrane 110 and between the posts 125 and the membrane 110. However, the membrane 110, the mass body 120, and the posts 125 do not need to be formed by etching the SOI substrate but may be formed by etching a general silicon substrate, or the like.

The piezoelectric body 130 serves to drive the mass body 120 or sense a displacement of the mass body 120 and is formed in the membrane 110. Here, the piezoelectric body 130 may be made of lead zirconate titanate (PZT), barium titanate ($BaTiO_3$), lead titanate ($PbTiO_3$), lithium niobate ($LiNbO_3$), silicon dioxide ($SiO_2$), or the like. In detail, when voltage is applied to the piezoelectric body 130, an inverse piezoelectric effect of expanding and contracting the piezoelectric body 130 is generated. The mass body 120 disposed under the membrane 110 may be driven by using the inverse piezoelectric effect. On the other hand, when stress is applied to the piezoelectric body 130, a piezoelectric effect of generating potential difference is generated. The displacement of the mass body 120 disposed under the membrane 110 may be sensed.

Meanwhile, in order to use the inverse piezoelectric effect and a piezoelectric effect of the above-mentioned piezoelectric body 130, a first electrode 131 is formed on the top surface of the piezoelectric body 130 and a second electrode 137 is formed on the bottom surface of the piezoelectric body 130. Here, the first electrode 131 may be formed by being patterned on the top surface of the piezoelectric body 130 and the second electrode 137 may be grounded by being formed on the bottom surface of the piezoelectric body as a common electrode. In this case, in order to insulate the second electrode 137 and the membrane 110, the insulating layer 119 of a silicon oxide film, or the like may be formed between the second electrode 137 and the membrane 110. Further, the first electrode 131 may be configured of sensing electrodes 131*b* using the piezoelectric effect and driving electrodes 131*a* using the inverse piezoelectric effect. For example, as shown in FIG. 3, the driving electrodes 131*a* and the sensing electrodes 131*b* configuring the first electrode 131 are each formed to have an arc. In detail, when the piezoelectric body 130 is partitioned into an inner annular region 133 surrounding a center C of the piezoelectric body 130 and an outer annular region 135 surrounding the inner annular region 133, the inner annular region 133 may be patterned with the driving electrodes 131*a* in an arc divided into N (N is a natural number) and the outer annular region 135 may be patterned with the sensing electrodes 131*b* in an arc divided into N. In this case, the sensing electrodes 131*b* may be patterned to correspond to the driving electrodes 131*a*.

Figure 4:
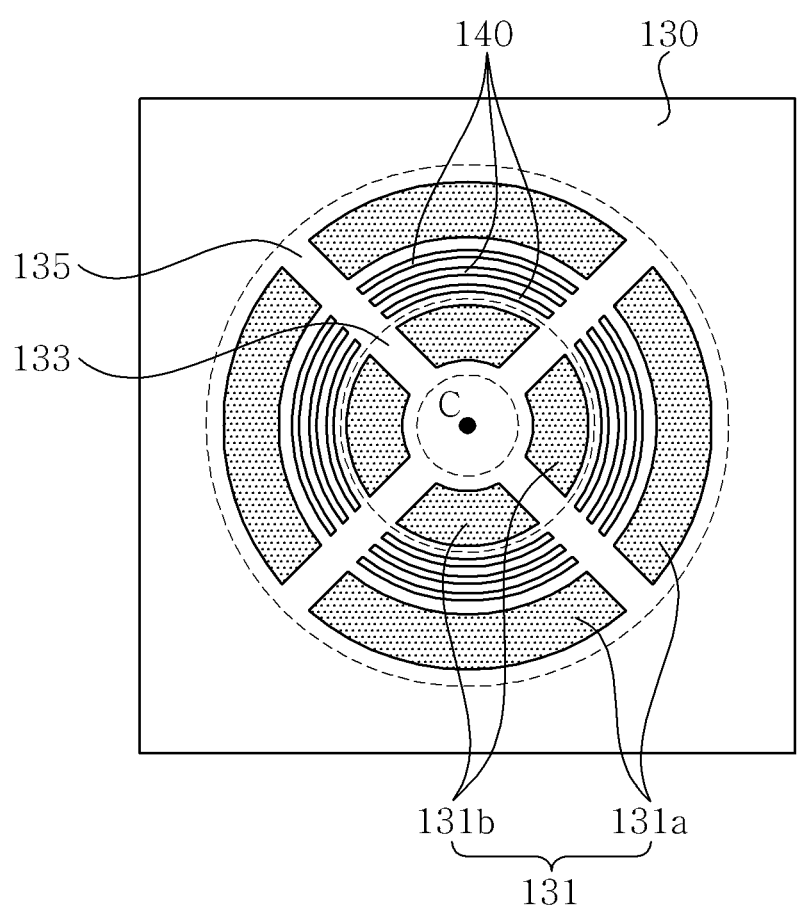
FIG. 4 is a plan view showing a modified example of the inertial sensor shown in FIG. 3.

Meanwhile, FIG. 4 is a plan view showing a modified example of the inertial sensor shown in FIG. 3. As shown in FIG. 4, a position of the driving electrodes 131*a* and the sensing electrodes 131*b* may be changed from each other. For example, when the piezoelectric body 130 is partitioned into the inner annular region 133 surrounding the center C of the piezoelectric body 130 and the outer annular region 135 surrounding the inner annular region 133, the inner annular region 133 may be patterned with the sensing electrodes 131*b* in an arc divided into N (N is a natural number) and the outer annular region 135 may be patterned with the driving electrodes 131*a* in an arc divided into N. In this case, the driving electrodes 131*a* may be patterned to correspond to the sensing electrodes 131*b*.

However, the driving electrodes 131*a* and the sensing electrodes 131*b* are each patterned by being divided into four, but are not limited thereto. Therefore, the number of driving electrodes 131*a* and the number of sensing electrodes 131*b* may be determined in consideration of manufacturing costs or sensitivity to be implemented.

The trenches 140 (see FIG. 1 or 2), which serve to prevent a wave from being propagated in an unnecessary direction by providing directivity while retaining the rigidity of the piezoelectric body 130, are formed by being collapsed in a thickness direction of the piezoelectric body 130. Herein, the trenches 140 vertically meet a direction driving the mass body 120 on a plane parallel with the membrane 110. As described above, when the trenches are formed to vertically meet the driving direction of the mass body 120, the rigidity of the piezoelectric body 130 is relatively stronger in respect to a direction other than the driving direction of the mass body 120. Therefore, the inertial sensor 100 may be accurately driven only in the desired direction by preventing a wave from being propagated in a direction other than the driving direction. Further, when the trenches are formed to vertically meet the driving direction of the mass body 120, the rigidity of the piezoelectric body 130 is relatively weaker in respect to the driving direction of the mass body 120. Therefore, even though the same force is applied to the mass body 120 by the piezoelectric body 130, the displacement of the driven mass body 120 may be more increased before the trench 140 is formed.

Figure 5:
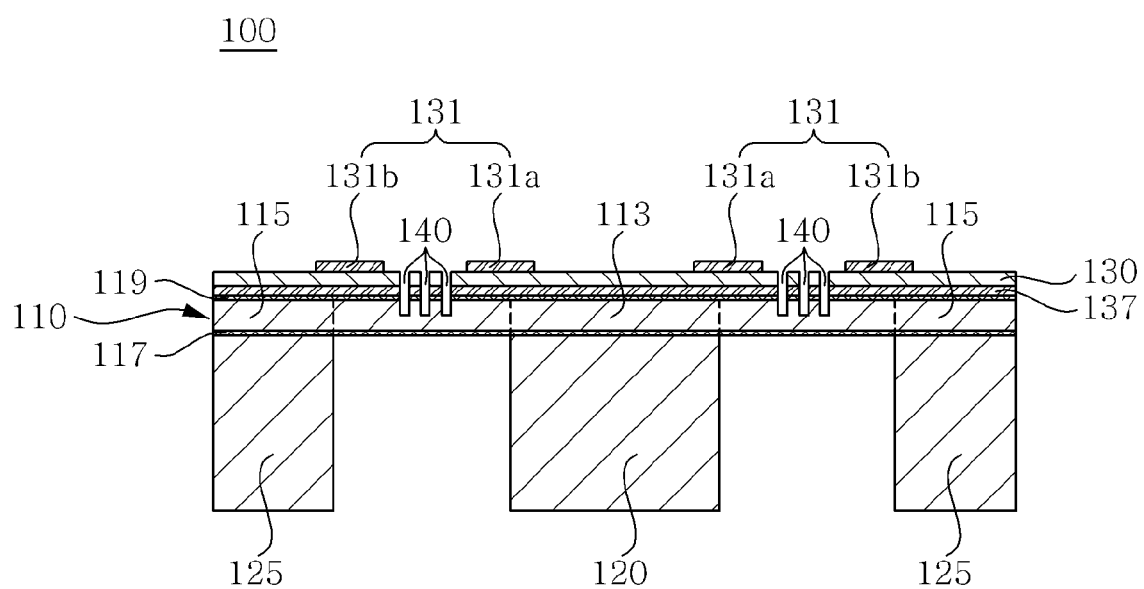
FIG. 5 is a cross-sectional view showing a modified example of the inertial sensor shown in FIG. 1.

Meanwhile, the trenches 140 may be formed by selectively etching the piezoelectric body 130. In this case, the trenches 140 may be formed immediately before the second electrode 137 by using the second electrode 137 formed on the bottom surface of the piezoelectric body 130 as an etch stop layer (see FIG. 1). In this case, the trenches 140 are formed only in the piezoelectric body 130 and the scope of the present invention is not limited thereto. For example, FIG. 5 is a cross-sectional view showing a modified example of the inertial sensor shown in FIG. 1. As shown in FIG. 5, the trenches 140 may be formed to extend to a predetermined thickness of the membrane 110 penetrating through the second electrode 137.

Figure 6:
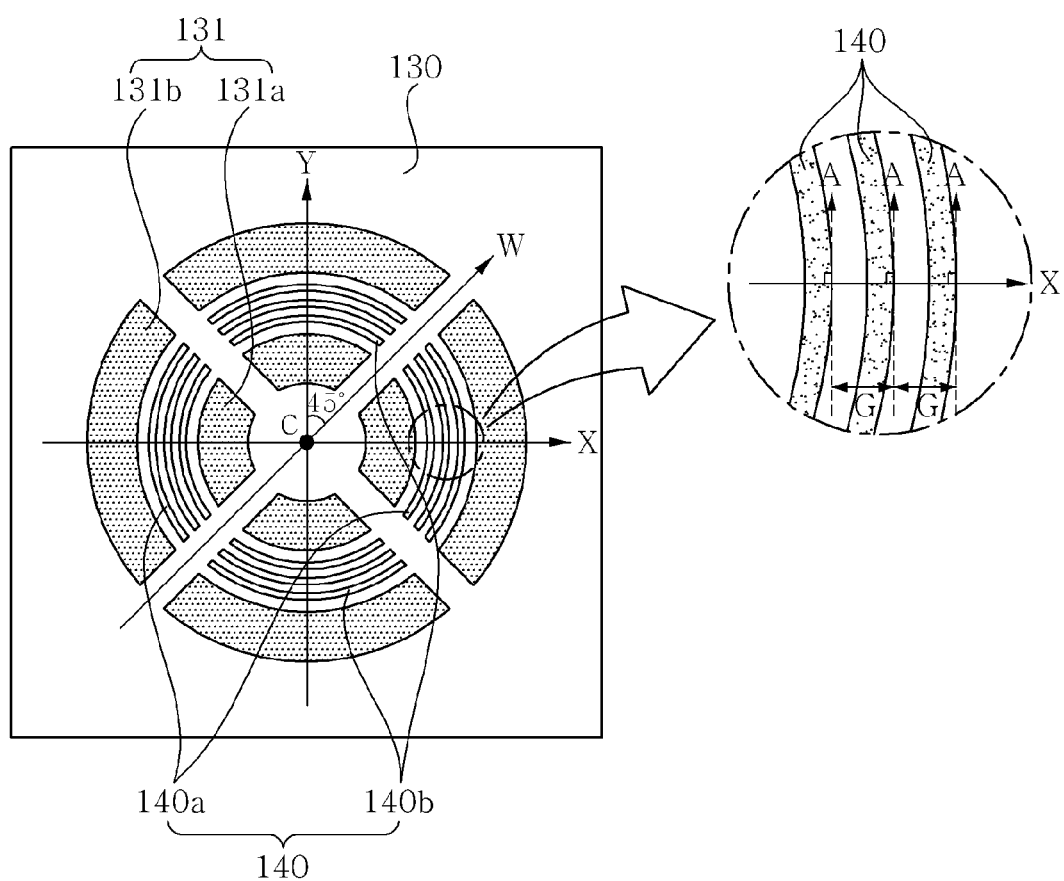
FIG. 6 is a plan view showing an arrangement of trenches with respect to a driving direction of a mass body shown in FIG. 1.

In addition, the arrangement of the trenches 140 with respect to the driving direction will be described in detail with reference to FIG. 6. First, a first axis X and a second axis Y that are vertical to each other on a plane parallel with the membrane 110 are defined. When the mass body 120 is driven in the first axis X direction and the second axis Y direction, the trenches 140 are formed so as to vertically meet the first axis X direction and the second axis X direction. That is, a tangential direction A of the trench 140 vertically intersects with the driving directions X and Y of the mass body 120 (see an enlarged view of FIG. 6). For example, the trenches 140 may be formed to have an arc based on the intersecting point (a center C of the piezoelectric body 130) of the first axis X and the second axis Y. In detail, the trenches 140 are formed to have an arc divided into four so that the tangential direction A of two trenches 140*a* facing each other vertically meet the first axis X and the tangential direction A of two remaining trenches 140*b* facing each other vertically meets the second axis Y. Therefore, the rigidity of the piezoelectric body 130 is relatively stronger with respect to the direction (for example, a third axis W direction that is 45° with respect to the first axis X and the second axis Y) other than the first axis X direction and the second axis Y direction, thereby preventing the wave from being propagated to the direction (for example, the third axis W direction) other than the driving direction of the mass body 120. On the other hand, the rigidity of the piezoelectric body 130 is relatively stronger with respect to the first axis X direction and the second axis Y direction to increase the displacement of the driven mass body 120, such that the sensitivity of the inertial sensor 100 may be improved. Meanwhile, the trenches 140 may be formed to have an arc formed by dividing the concentric circle. That is, the trenches 140 may be formed in a plurality of arcs having the same center but different radii. As described above, the trenches 140 are formed to have an arc formed by dividing the concentric circle, thereby allowing the piezoelectric body 130 to more effectively have directivity. In addition, when the trenches 140 are formed to have an arc formed by dividing at least three concentric circles, a gap G among respective concentric circles may be constant so as to make variation of rigidity radially constant (see an enlarged view of FIG. 6).

Figure 7:
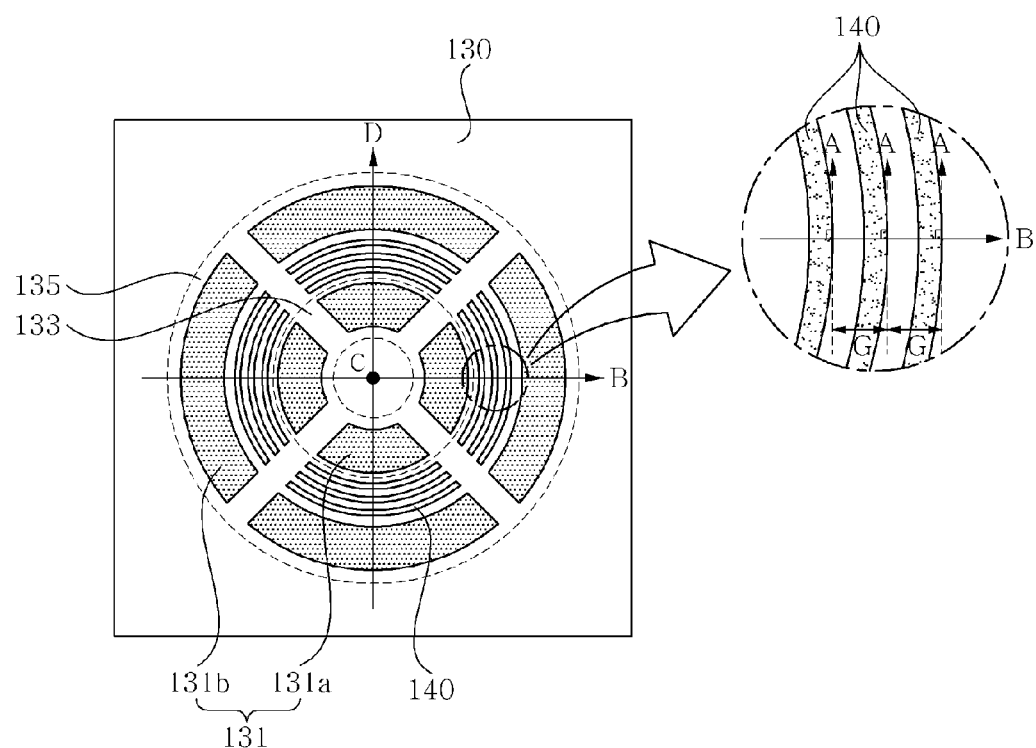
FIG. 7 is a plan view showing the arrangement of the trenches based on a first electrode shown in FIG. 1.

Meanwhile, referring to FIG. 7, the arrangement of the trenches 140 will be described based on the first electrode 131. First, the first electrode 131 may be configured of the driving electrodes 131*a* patterned in an arc divided into N in the inner annular region 133 and the sensing electrodes 131*b* patterned in an arc divided into N in the outer annular region 135 to correspond to the driving electrodes 131*a*. In this case, the trenches 140 may be formed in the arc divided into N between the driving electrodes 131*a* and sensing electrodes 131*b* adjacent to each other (between the driving electrodes 131*a* and the sensing electrodes 131*b* corresponding to each other). That is, as shown, when the driving electrodes 131*a* and the sensing electrodes 131*b* are each patterned by being divided into four, the trench 140 is formed to have an arc divided into four between the driving electrodes 131*a* and the sensing electrodes 131*b*. As described above, when the trenches 140 are formed to have an arc between the driving electrodes 131*a* and the sensing electrodes 131*b*, the trenches 140 are formed to correspond to the driving electrodes 131*a* and the mass body 120 is driven in normal directions B and D of the driving electrodes 131*a*, such that the tangential direction A of the trench 140 vertically meets the directions B and D in which the mass body 120 is driven (see an enlarged view of FIG. 7). Further, the trenches 140 may be formed to have an arc formed by dividing the concentric circle between the driving electrodes 131a and the sensing electrodes 131b. Here, when the trenches 140 are formed to have an arc formed by dividing at least three concentric circles, the gap G among respective concentric circles may be constant. Meanwhile, the position of the driving electrodes 131a and the sensing electrodes 131b may be changed from each other (see FIG. 4). Even in this case, the trenches 140 may be disposed between the driving electrodes 131a and the sensing electrodes 131b in the same manner.

The preferred embodiments of the present invention can drive the inertial sensor only in the desired specific direction by preventing the wave from being propagated in the unnecessary direction by forming the trenches so as to be collapsed in the thickness direction of the piezoelectric body to provide directivity while maintaining the rigidity of the piezoelectric body.

Although the preferred embodiments of the present invention have been disclosed for illustrative purposes, they are for specifically explaining the present invention and thus an inertial sensor according to the present invention is not limited thereto, but those skilled in the art will appreciate that various modifications, additions and substitutions are possible, without departing from the scope and spirit of the invention as disclosed in the accompanying claims.

In addition, any and all modifications, variations or equivalent arrangements should be considered to be within the scope of the invention, and the detailed scope of the invention will be disclosed by the accompanying claims.

What is claimed is:

1. An inertial sensor, comprising:
a membrane;
a mass body disposed under the membrane;
a piezoelectric body formed on the membrane to drive the mass body, and comprising a driving electrode to drive the mass body and a sensing electrode to sense displacement of the mass body; and
trenches formed by being collapsed in a thickness direction of the piezoelectric body so as to vertically meet a direction in which the mass body is driven,
wherein the trenches are located between the driving electrode and the sensing electrode.

2. The inertial sensor as set forth in claim 1, further comprising:
a first electrode formed on a top surface of the piezoelectric body; and
a second electrode formed on a bottom surface of the piezoelectric body.

3. The inertial sensor as set forth in claim 2, wherein the trenches are formed immediately before the second electrode.

4. The inertial sensor as set forth in claim 1, wherein the trenches are extendedly formed to a predetermined thickness of the membrane.

5. The inertial sensor as set forth in claim 1, wherein a first axis direction and a second axis direction vertical to each other is defined on a plane parallel with the membrane, and
when the mass body is driven in the first axis direction and the second axis direction, the trenches are formed to have an arc based on an intersecting point of the first axis and the second axis so that the trenches vertically meet the first axis direction and the second axis direction.

6. The inertial sensor as set forth in claim 5, wherein the trenches are formed to have an arc divided into four so that two trenches facing each other vertically meet the first axis and the two remaining trenches facing each other vertically meet the second axis.

7. The inertial sensor as set forth in claim 5, wherein the trenches are formed to have an arc formed by dividing a concentric circle.

8. The inertial sensor as set forth in claim 7, wherein when the trenches are formed to have an arc formed by dividing at least three concentric circles, a gap among respective concentric circles is constant.

9. The inertial sensor as set forth in claim 2, wherein the piezoelectric body is partitioned into an inner annular region surrounding a center of the piezoelectric body and an outer annular region surrounding the inner annular region, and
wherein the first electrode includes:
driving electrodes patterned in an arc divided into N in the inner annular region; and
sensing electrodes patterned in an arc divided into N in the outer annular region to correspond to the driving electrodes.

10. The inertial sensor as set forth in claim 9, wherein the trenches are formed to have an arc divided into N between the driving electrodes and the sensing electrodes adjacent to each other.

11. The inertial sensor as set forth in claim 10, wherein the trenches are formed to have an arc formed by dividing a concentric circle into N.

12. The inertial sensor as set forth in claim 11, wherein when the trenches are formed to have an arc formed by dividing at least three concentric circles, a gap among respective concentric circles is constant.

13. The inertial sensor as set forth in claim 2, wherein the piezoelectric body is partitioned into an inner annular region surrounding a center of the piezoelectric body and an outer annular region surrounding the inner annular region, and
wherein the first electrode includes:
sensing electrodes patterned in an arc divided into N in the inner annular region; and
driving electrodes patterned in an arc divided into N in the outer annular region to correspond to the driving electrodes.

14. The inertial sensor as set forth in claim 13, wherein the trenches are formed to have an arc divided into N between the driving electrodes and sensing electrodes adjacent to each other.

15. The inertial sensor as set forth in claim 14, wherein the trenches are formed to have an arc formed by dividing a concentric circle into N.

16. The inertial sensor as set forth in claim 15, wherein when the trenches are formed to have an arc formed by dividing at least three concentric circles, a gap among respective concentric circles is constant.

17. The inertial sensor as set forth in claim 1, wherein the mass body is disposed under a central portion of the membrane and further includes posts disposed under edges of the membrane.

* * * * *